July 2, 1968  J. E. ETTORRE  3,390,446

FLUID PRESSURE OPERATED PIN INSERTER

Filed April 13, 1966

INVENTOR.
James E. Ettorre

United States Patent Office 3,390,446
Patented July 2, 1968

3,390,446
FLUID PRESSURE OPERATED PIN INSERTER
James E. Ettorre, Fairfield, Conn.,
(472 Stratfield Road, Bridgeport, Conn. 06604)
Filed Apr. 13, 1966, Ser. No. 542,313
1 Claim. (Cl. 29—252)

ABSTRACT OF THE DISCLOSURE

An apparatus for inserting a pin into an apertured member which includes a U-shaped frame having one leg adjustably connected to a guide sleeve through which a hydraulically or pneumatically operated drive rod extends. A retainer sleeve for holding the pin to be inserted is slidably mounted on the free end of the drive rod with the end surface of the drive rod adapted to abut the end of the pin disposed within the retainer sleeve. A V-shaped locating channel formed on the other leg of the U-frame is adapted to position and support the apertured member with the aperture in longitudinal alignment with the axis of movement of the drive rod so that when the drive rod is actuated, the pin is forcibly inserted into the aperture. The frame may be longitudinally adjusted relative to the guide sleeve to vary the position of the locating channel, and thereby the apertured member relative to the drive rod so that the pin is properly inserted in the aperture when the drive rod is actuated.

---

The present invention relates to pin inserters and particularly to a new and improved pneumatically or hydraulically operated inserter. It is understood that "pin inserter" is intended to embrace the inserting of straight or tapered dowel pins, rivets, plugs tubular or roll pins and other similar artices into shafts, collars, hubs, shanks and the like which are predrilled to accept the article being inserted.

The principal object of the invention is to provide a portable, pneumatically or hydraulically operated pin inserter of minimum size and weight.

Another object of the invention is to provide such a pin inserter which eliminates permanent distortion of the pin or of the part into which the pin is being driven. Prior to this invention, the usual practice of driving the pin into place consisted of hammering the pin into the predrilled hole much as one would hammer a nail into a piece of wood. In some cases it was difficult to properly support the part receiving the pin, so that the part could easily be permanently deformed. The pin inserter of the present invention drives the pin into place by providing a direct squeeze between the pin and the part receiving the pin so that deleterious bending forces are eliminated.

The above as well as other objects and novel features of the invention will become apparent from the following description and accompanying drawings which are merely exemplary.

Figure 1:
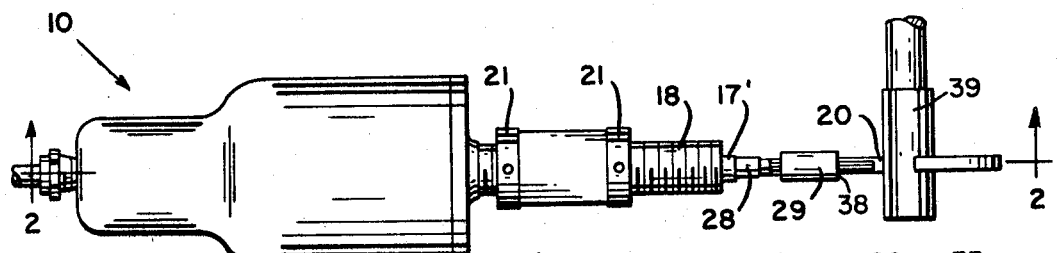
FIG. 1 is an elevational view of the pin inserter to which the principles of the invention have been applied.
Figure 2:
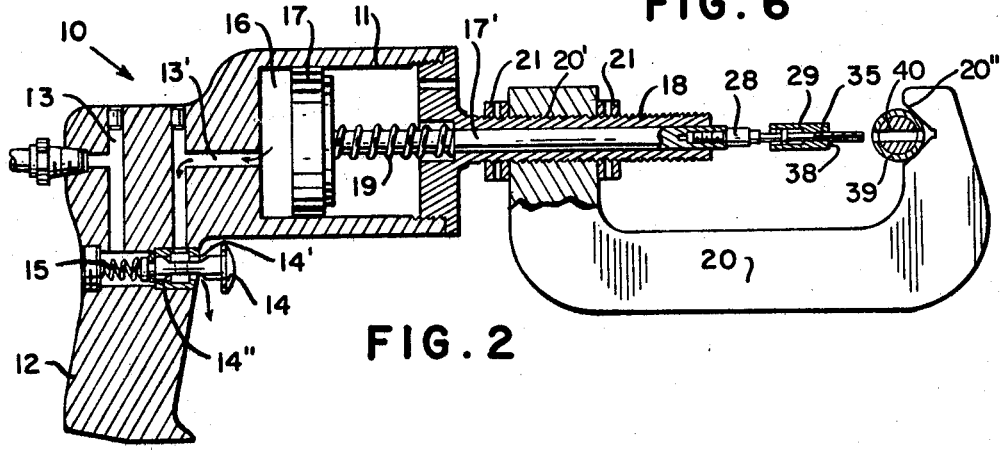
FIG. 2 is a sectional view taken substantially along line 2—2 of FIG. 1.
Figure 3:
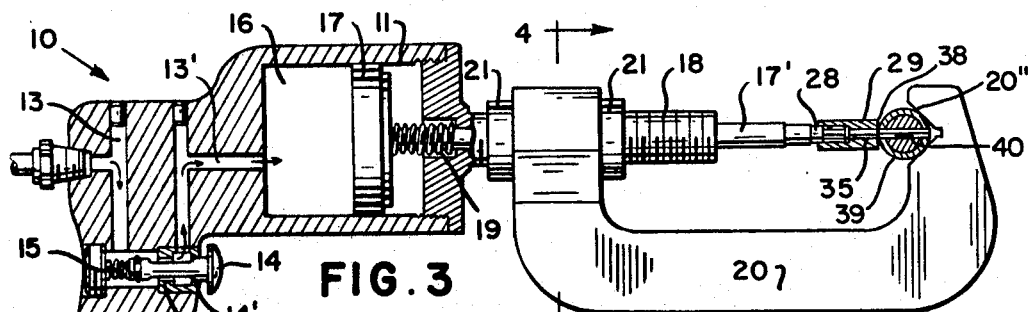
FIG. 3 is also a sectional view taken substantially along line 2—2 of FIG. 1, but with the piston shown in its rightward position.

Referring to the drawings, and particularly to FIGS. 1 and 2, the principles of the invention are shown as applied to a pneumatically or hydraulically operated pin inserter including a housing 10 which is provided with a bored end to form a cylinder 11 and may include a pistol grip 12 on the opposite end from the cylinder. The housing is provided with passageways 13, 13′ and control valve 14 for supplying or exhausting gas under pressure to or from the chamber 16 formed by the cylinder and the large end of the piston 17. Piston 17 is adapted to be reciprocated within cylinder 11 and piston rod 17′ reciprocates within guide sleeve 18, the large end of which is threaded into the cylinder end of housing 10. The admission of gas under pressure to chamber 16 will move the piston rightwardly (FIG. 3). When the gas is exhausted, spring 19 will return the piston leftwardly.

Referring to FIG. 3, it is evident that when valve 14 is manually depressed, exhaust port 14′ is closed and the inlet port 14″ is opened, thus allowing gas to flow through passageways 13 and 13′ into chamber 16. When valve 14 is released, spring 15 will urge valve 14 rightwardly, closing inlet port 14″ and opening outlet port 14′, permitting gas in chamber 16 to exhaust through passageway 13′ and exhaust port 14′. It should be understood that with modifications to the valving and by employing a suitable return line, a hydraulic system can be substituted for the gas system. Also, it is obvious that an electric solenoid and switch may be substituted for the piston 17 and valve 14 with equal facility.

A U-shaped support frame 20 is mounted on the guide sleeve 18 which has a threaded outer diameter. A positioning V-notch 20″ is located on frame 20 in centered relationship with the longitudinal axis of cylinder 11, guide sleeve 18 and bore 20′ of said frame. The function of the notch 20″ is to position, align and support the apertured part 39 into which the elongated pin is being inserted. The apparatus can be adapted to accommodate various sizes of apertured parts by adjusting frame 20 along guide sleeve 18. Adjusting nuts 21 are threaded onto sleeve 18 and are locked against opposing faces on each side of the bored end of support frame 20. The support frame 20 can be adjusted to various positions along the piston rod axis by threading nuts 21 along sleeve 18 to the desired location. Support frame 20 can be oriented in any angular position relative to the piston rod axis.

Figures 4, 5:
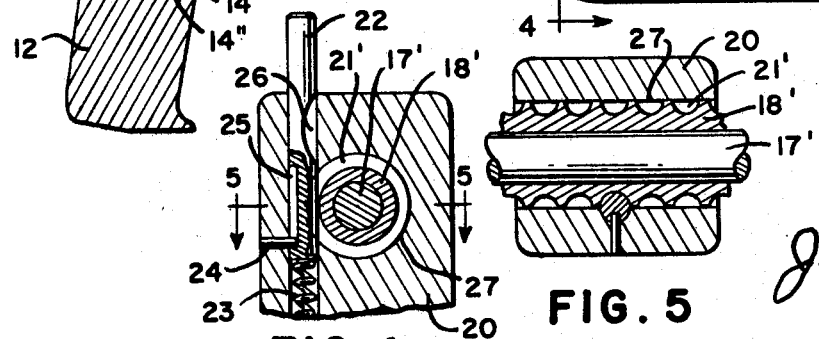
FIG. 4 is a sectional view taken substantially along line 4—4 of FIG. 3, but with some parts modified to show an alternate construction for adjusting the U-shaped support frame.
FIG. 5 is a sectional view taken along line 5—5 of FIG. 4.

An alternate means for adjusting the support frame 20 is shown in FIGS. 4 and 5. In this embodiment, the outer diameter of the guide sleeve 18′ contains a series of peripheral grooves 21′. A slidable rod 22 engages one of the grooves 21′ in the guide sleeve 18′ when it is held in outwardly extended position by spring 23 with keyway pin 24 abutting against the end of keyway 25. Keyway pin 24 cooperates with keyway 25 to prevent rod 22 from rotating so that when it is depressed until keyway pin 24 strikes the opposite end of keyway 25, the radius notch 26 in rod 22 will coincide with the radius of the bore 27 in support frame 20, thus permitting the support frame to be moved axially.

Figure 6:
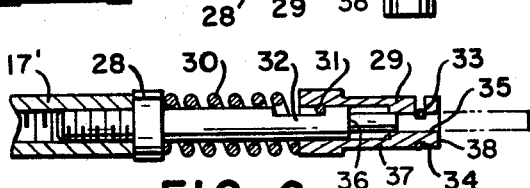
FIG. 6 is an enlarged sectional view showing an alternate pin holding arrangement.

Referring to FIG. 6, the right end of piston rod 17′ contains a threaded hole for accepting a pin drive rod 28 with a retainer sleeve 29 and a spring 30 which urges the retainer sleeve rightwardly. A keyway pin 31 cooperating with a flat groove 32 in drive rod 28 permits retainer sleeve 29 to move slidably along the drive rod 28 and provides an end stop so as to retain the sleeve onto the drive rod. A spring clip 33 in groove 34 protrudes into hole 35 of retainer sleeve 29. When a closed fitting pin is inserted into hole 35, spring clip 33 will provide a force holding the inserted pin against the wall of hole 35. By providing a number of drive rod, spring and retainer sleeve assemblies, all with different sizes of holes 35, a range of pin diameters can be used.

When it is desired to use the apparatus, the pin to be inserted is placed into hole 35 of retainer sleeve 29. The apertured part 39 into which the pin is to be driven is positioned in the V-notch 20″ of the support frame 20 with the aperture 40 in centered relationship with the longitudinal axis of the apparatus. The operator depresses valve 14, closing exhaust port 14′ allowing fluid to flow through passageways 13, 14″ and 13′ to chamber 16, causing the piston 17 to move rightwardly. Rightward movement of the piston 17 provides an axial thrust through the piston rod 17′ and the pin drive rod 28 onto the end of the pin, forcing the pin into the aperture 40. When the surface 38 of the retainer sleeve 29 abuts the apertured part 39, the piston 17, piston rod 17′ and pin drive rod 28 continue to move rightwardly until shoulder 36 of the drive rod 28 strikes the face 37 of the counterbore in the retainer sleeve 29 (FIG. 6), at which time the pin will have been pushed through the hole 35 in the retainer sleeve 29. When the valve 14 is released, spring 15 forces it rightwardly, opening exhaust port 14′ and blocking inlet port 14″. Spring 19 forces piston 17 leftwardly when the air in chamber 16 is vented through passageway 13′ and out exhaust port 14′. Spring 30 returns retainer sleeve 29 to its original position.

The herein described pin inserting apparatus is automatic in operation although under manual control. The simplicity of its design and construction permits it to be produced at comparatively low cost. Various parts of this apparatus may be constructed of light-weight material, such as aluminum, so that it can readily be manipulated without tiring the user. The design and construction of the apparatus are such that direct support is provided for an apertured part when a pin is being inserted so that marring and detrimental bending forces are eliminated.

It is obvious that the retainer sleeve and spring assembly may be omitted without departing from the spirit of the invention. The majority of dowels and pins contain chamfered ends to permit partial entry of the dowel or pin into the hole after which the driver rod completes the insertion.

Although the various features of the air or hydraulically operated pin inserter have been shown and described in detail to fully disclose four embodiments of the invention, it will be evident that changes may be made in such details and certain features may be used without others without departing from the principles of the invention.

What is claimed is:

1. A pin inserting apparatus comprising a U-shaped support frame having one leg adjustably secured to a guide sleeve having a longitudinal axis; positioning means on an opposed leg of said U-shaped support frame for locating and supporting an apertured pin receiving member in a predetermined location relative to said guide sleeve whereby an aperture in said member is disposed in longitudinal alignment with said longitudinal axis; a drive rod reciprocably mounted in said guide sleeve for movement along said longitudinal axis; an end surface on said drive rod, a retainer sleeve slidably mounted on said drive rod and spring biased toward said end surface, said retainer sleeve being adapted to position and hold a pin adjacent said aperture in alignment with said longitudinal axis; a housing connected to said guide sleeve having a manually engageable handle; driving means disposed in said housing connected to said drive rod for forcibly moving said rod toward said positioning means; spring means biasing said rod in the direction away from said positioning means; and manual actuating means adjacent said handle for actuating said driving means whereby said end surface is adapted to forcibly press a pin disposed in said retainer sleeve into said aperture with the pin supported and guided by said retainer sleeve.

References Cited

UNITED STATES PATENTS

| | | | |
|---|---|---|---|
| 1,466,992 | 9/1923 | Craun | 29—249 |
| 1,467,914 | 9/1923 | Balcom | 29—249 |
| 1,478,555 | 12/1923 | Dahm | 29—249 |
| 1,488,208 | 3/1924 | Laplace et al. | 29—249 |
| 2,235,643 | 3/1941 | Pfauser | 29—252 |
| 2,457,930 | 1/1949 | Smith | 29—252 X |
| 2,697,872 | 12/1954 | Armstrong | 29—252 |
| 2,767,400 | 10/1956 | Haberstump | 29—252 X |
| 2,767,401 | 10/1956 | Haberstump | 29—252 X |
| 3,149,537 | 9/1964 | Fink | 29—270 |
| 3,164,283 | 1/1965 | Olson | 29—252 X |

FOREIGN PATENTS 562,071    8/1958    Canada.

MYRON C. KRUSE, *Primary Examiner.*